United States Patent [19]

Decious et al.

[11] Patent Number: 5,184,122
[45] Date of Patent: Feb. 2, 1993

[54] FACILITY MANAGEMENT SYSTEM WITH IMPROVED RETURN TO AUTOMATIC CONTROL

[75] Inventors: Gaylon Decious, Milwaukee; Clay Nesler, New Berlin, both of Wis.

[73] Assignee: Johnson Service Company, Milwaukee, Wis.

[21] Appl. No.: 648,590

[22] Filed: Jan. 31, 1991

[51] Int. Cl.⁵ .............................................. G05B 7/00
[52] U.S. Cl. ............................ 340/870.16; 318/591;
340/825.06; 165/24; 165/25
[58] Field of Search ............... 340/870.16, 825.06;
307/38, 116; 318/590, 591, 610; 364/180, 181,
162; 237/2 A; 165/24, 25, 33

[56] References Cited

U.S. PATENT DOCUMENTS

| | | | |
|---|---|---|---|
| 4,451,879 | 5/1984 | Welch et al. | 318/591 |
| 4,951,476 | 8/1990 | Yamamoto et al. | 165/25 |
| 4,991,770 | 2/1991 | Bird et al. | 318/610 |

OTHER PUBLICATIONS

W. F. Stoecker and P. A. Stoecker, Microcomputer Control of Thermal and Mechanical Systems, 1989, pp. 413–414.

Primary Examiner—Donald J. Yusko
Assistant Examiner—Michael Krakovsky
Attorney, Agent, or Firm—Foley & Lardner

[57] ABSTRACT

There is disclosed a control system for use, for example, in facility management which controls an environmental parameter to maintain the parameter at a given set point. A PID Controller is coupled to a remote sensor for generating a feedback signal responsive to the parameter level sensed by the remote sensor. The PID Controller is responsive to being coupled to a field device for providing the field device with an automatic control signal having a level derived from the sum of integral, derivative, and proportional actions to the feedback or error signal to place the field device under automatic control, and is responsive to being decoupled from the field device when the field device is under manual control for either terminating the generation of the automatic control signal or providing an estimate of a manual control signal. When recoupled to the field device, the PID Controller provides the field device with a control signal at an initial level based upon the level of a manually selected control signal, the last level of the automatic control signal provided to the field device prior to being decoupled from the field device or the last estimate of the manual control signal.

32 Claims, 6 Drawing Sheets

FACILITY MANAGEMENT SYSTEM WITH IMPROVED RETURN TO AUTOMATIC CONTROL

BACKGROUND OF THE INVENTION

The present invention is generally directed to a control system and more particularly to an improved facility management system which provides a smooth transition from manual control to automatic control.

Control systems in the form of facility management systems are well known in the art. Such systems are generally employed to control the internal environment of and/or provide security and safety monitoring in large structures such as office buildings, manufacturing facilities, or the like and other environmental conditions such as static pressure in ducts. In providing such environmental control, facility management systems include controllers which perform various closed-loop control functions to control field devices such as heaters, coolers, fan motors, and dampers, for example, to maintain certain environmental parameters such as temperature, humidity, or static pressure at desired setpoints. Remote sensors are employed to sense the condition of the environmental parameters and provide feedback signals indicative of the parametric levels sensed. The controllers receive the feedback signals and control the field devices in accordance therewith. For example, if a temperature is sensed below a setpoint, the controller will issue a binary control signal to a heater to turn the heater on for raising the temperature. When the temperature reaches the desired setpoint, the controller issues another binary control signal to turn the heater off.

Controllers also issue analog control signals for controlling, for example, the speed of fan motors, and incremental control signals such as duration modulated control signals to control the position of dampers. In deriving such control signals, modern day facility management systems utilize a microprocessor-based controller known in the art as a Digital PID Controller. A Digital PID Controller, hereafter referred to as a PID Controller, at periodic intervals, senses the feedback signal level from a remote sensor and generates an error signal equal to the difference between the setpoint and the feedback signal level. The PID Controller reacts to the error and feedback signals to then issue a multiple bit digital control signal representing a magnitude equal to the sum of proportional, integral and derivative control actions. Generally, the proportional action is derived from the error sensed in the current time interval and the integral action is derived from the time integral of the errors up to the previous time interval. The derivative action is derived from the time derivative of the feedback signal. The digital control signal is then converted, for example, to an analog signal or to an incremental signal having a duration related to the magnitude represented by the digital control signal. By deriving the control signal including proportional, derivative, and integral reaction to these signals, PID Controllers are capable of maintaining the controlled parameter at setpoint more accurately and responding to off setpoint conditions more rapidly than if the control signals were derived from a proportional factor alone.

While PID Controllers have performed well to effect automatic control of environmental parameters, there has been several problems associated with this type of controller in the past when a field device is returned to automatic control after having been taken off of automatic control and placed in manual control. When a field device is taken off automatic control, it is placed under manual control to respond to manually selected control signals. To that end, the control outputs of the PID Controller are effectively decoupled from the field device. One problem arises in prior art facility management systems have been arranged such that the PID Controller, even when a field device it has controlled is now under manual control, continues to generate error signals and control signals as previously described. Since manual control of a field device usually renders an environmental parameter further from setpoint and for a longer period of time than automatic control, the integral factor of the control signal can become exceedingly large. When the field device is returned to automatic control under the control of the PID controller, it will be caused to react to the control signal level then being generated by the PID Controller which will in turn cause the field device to overreact. This in turn causes the environmental parameter to vary from setpoint by an extreme amount. The next control signal issued will react to a substantial error signal and cause the field device to once again overreact but in the other direction to the end that returning to automatic control results in large fluctuations in the parameter under control about the setpoint. These fluctuations may continue for a considerable length of time until the parameter is finally brought to an equilibrium control condition at the setpoint. Thus, there is a need in the art for a improved control system having a PID Controller which provides a smooth transition from manual control to automatic control.

An additional problem found in prior art facility management systems, is even if the integral action of the PID Controller was disabled, the prior art controllers provided no logic for bringing the environmental parameter smoothly into control. The prior art controllers had no way of determining what position the field device had been placed while in manual control, and therefore could not return to automatic control from that position, providing the smoothest return to control. All that the prior art controllers could do was to start automatic control from the position they were at when the field device was placed in manual control or start at some default position. This had the potential of introducing a large change in the field device position when the field device was returned to automatic control. Thus there is a need in the art for an improved control system having a PID Controller which can reduce or eliminate this fluctuation by returning from manual control at an initial position that is the same as where the field device was positioned while in manual control. In addition, there is a need in the art for estimating this initial position if the position of the field device can not be directly sensed.

SUMMARY OF THE INVENTION

The invention therefore provides a control system of the type which controls a parameter to maintain the parameter at a given setpoint. The control system includes device means responsive to an automatic control signal when under automatic control or a manually selected control signal when under manual control for effecting the parameter and sensor means for sensing the level of the parameter and providing a feedback signal responsive to the sensed parameter level. The control system further includes automatic control means coupled to the sensor means and being responsive to being coupled to the device means for generating an automatic control signal for the device means having a level derived from the sum of integral, derivative and proportional actions to the feedback signal for automatically controlling the device means and interface means coupled between the automatic control means and the device means for coupling the automatic control means to the device means to place the device means under automatic control and for decoupling the automatic control means from the device means under manual control of a manually selected control signal. The automatic control means is responsive to being decoupled from the device means by the interface means for terminating the generation of the automatic control signal.

The automatic control means may be arranged for providing the automatic control signal to the device means at an initial level based upon the level of the manually selected control signal upon being recoupled to the device means.

The automatic control means may be arranged for storing the last level of the automatic control signal provided to the device means prior to being decoupled from the device means and the value of the feedback signal prior to being decoupled from the device means and may also be arranged to be responsive to being recoupled to the device means for providing the automatic control signal to the device means at an initial level. The initial level may be based on the stored level of the automatic control signal, the stored level of the feedback signal, the current level of the feedback signal, and a proportional factor coefficient.

The present invention further provides a facility management system of the type which controls an environmental parameter to maintain the parameter at a given setpoint. The facility management system includes a field device responsive to an automatic control when under automatic control or a manually selected control signal when under manual control for effecting the environmental parameter and a remote sensor for sensing the level of the environmental parameter and providing a feedback signal responsive to the sensed parameter level. The system further includes automatic control means coupled to the remote sensor and being responsive to being coupled to the field device for generating an automatic control signal for the field device having a level derived from the sum of integral, derivative and proportional actions to the feedback signal for automatically controlling the field device and interface means coupled between the automatic control means and the field device for coupling the automatic control means to the field device to place the field device under automatic control and for decoupling the automatic control means from the field device for placing the field device under manual control of a manually selected control signal. The automatic control means is responsive to being decoupled from the field device from the interface means for terminating the generation of the automatic control signal.

The present invention further provides a facility management system of the type which controls a environmental parameter to maintain the parameter at a given setpoint. The facility management system includes a field device responsive to an automatic control signal when under automatic control or a manually selected control signal when under manual control for effecting the environmental parameter and a remote sensor for sensing the level of the environmental parameter and providing a feedback signal responsive to the sensed parameter level. The system further includes automatic control means coupled to the remote sensor and responsive to being coupled to the field device for generating an automatic control signal for the field device having a level derived from the sum of integral, derivative and proportional actions to the feedback signal to place the field device under automatic control and first interface means for coupling the automatic control means to and decoupling the automatic control means from the field device. The first interface means is arranged to provide the field device with the manually selected control signals upon decoupling the automatic control means from the field device. The automatic control means is responsive to being decoupled from the field device by the first interface means when the field device is under manual control for terminating the generation of the automatic control signal and is responsive to being recoupled to the field device by the first interface means for providing the automatic control signal to the field device at a first initial level based upon the level of the manually selected control signal upon being recoupled to the field device.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals indicate identical elements, and wherein:

DETAILED DESCRIPTION OF THE PREFERRED EMBODIMENT

Figure 1:
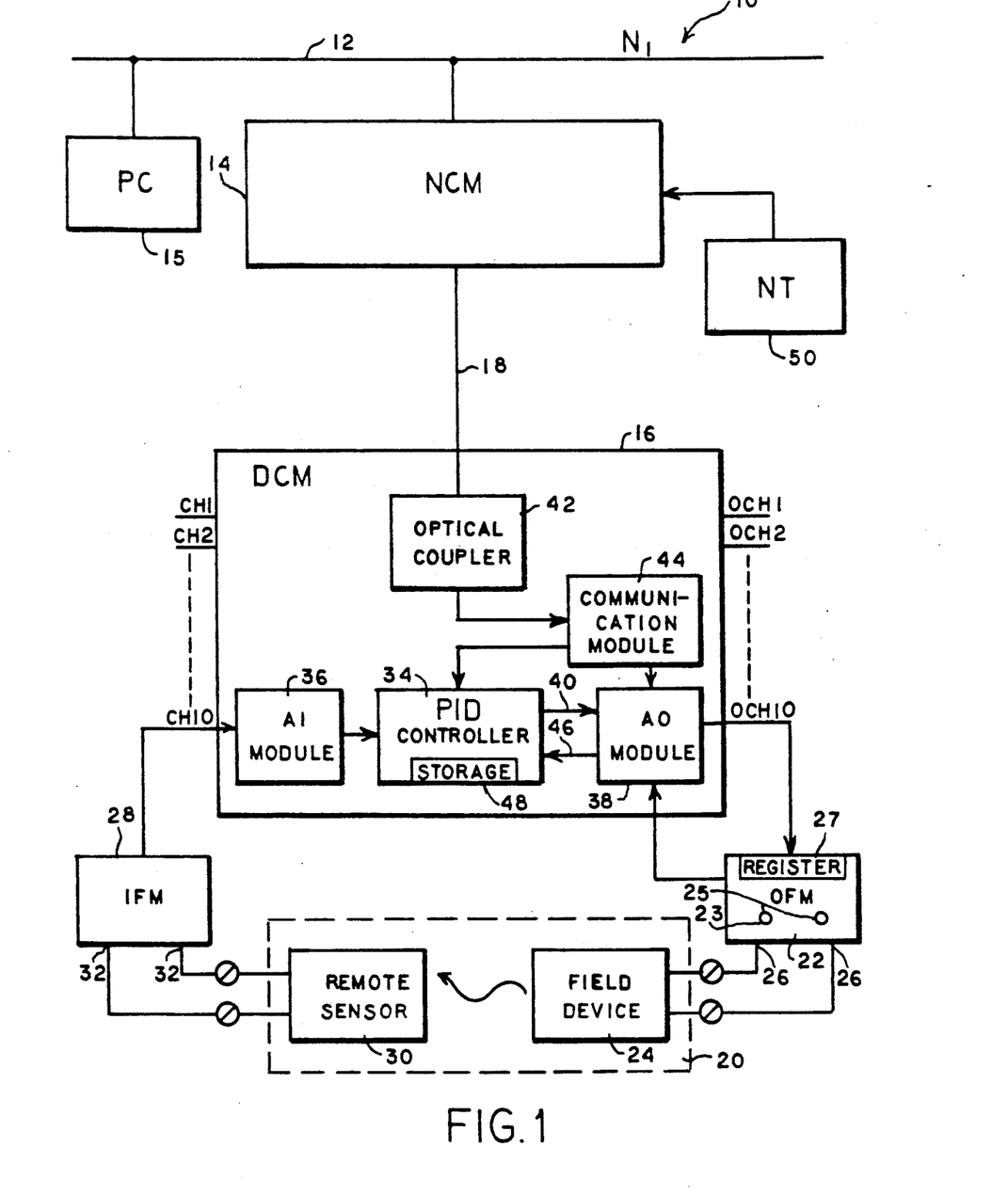
FIG. 1 is a block diagram of a facility management system embodying the present invention.

Referring now to FIG. 1, it illustrates a facility management system 10 embodying the present invention. The system 10 generally includes a main communication bus 12, which may be an N1 LAN ARCNET bus, a network control module 14, a personal computer 15, a digital control module 16, and another bus 18, which may be an N2 OPTOMUX bus interconnecting the network control module 14 to the digital control module 16. LAN ARCNET and OPTOMUX buses 12 and 18 respectively, are of the type well known in the art.

As illustrated in FIG. 1, the system there shown includes just one network control module and digital control module for exemplary purposes, and it should be understood that additional network control modules may be connected to the main communication bus 12 in a practical system. Additional digital control modules may also be connected to the communication bus 18 on any network control module as well. This type of control system is referred to as a "distributed system", wherein each network control module and personal computer is on a par with all other network control modules and personal computers and communicates with all other network control modules and personal computers on the bus 12.

The main function of the network control module is to communicate with the other network control modules of the system on an equal basis and to control its associated digital control module(s) under its own assigned software protocol. Such a protocol may include setting temperature control setpoints, heating schedules, lighting schedules, et cetera. The network control module, in accordance with its protocol, sends high level commands to the digital control module which then executes on those commands by performing closed-loop operations by issuing suitable control signals to, for example, control an environmental parameter of an enclosed space, such as space 20, to maintain a parameter at a given setpoint. The digital control module issues the control signals at its outputs responsive to sensed input conditions by its remote sensors.

To that end, the digital control module 16 includes a plurality of outputs identified as OCH1 through OCH10. The digital control module 16 further includes a plurality of inputs identified as CH1 through CH10 which receive feedback signals from the remote sensors. Since the digital control module 16 includes ten input channels and ten output channels, the digital control module 16 may be configured to control up to ten closed-loop operations. One such closed-loop operation is configured in FIG. 1 in connection with output channel OCH10 and input channel CH10.

Output channel OCH10 is coupled to an output function module 22 which is in turn connected to a field device 24. If the parameter under control within the enclosed space 20 is, for example, a static pressure, the field device 24 may be a fan motor, the speed of which is controlled by the outputs 26 of the output function module 22 under the control of the control signals issued at the output OCH10 by the digital control module 16. The control signals issued by the digital control module 16 are preferably in digital form and the output function module 22 includes a digital to analog converter for converting the digital output of the digital control module 16 to an analog voltage which appears at its outputs 26 for controlling the field device 24.

While the output function module 22 is described in connection with this preferred embodiment as being of the type which provides an analog output signal, other output function modules may be required in a practical system for providing, for example, binary outputs which are duration modulated responsive to the digital output control signals of the digital control module 16. The former type of output (analog) is known as a proportional type output while the latter type (binary duration modulated) is known as an incremental type of output.

The input CH10 of the digital control module is coupled to an input function module 28 which is in turn coupled to a remote sensor 30. In accordance with this preferred embodiment, the remote sensor 30 may be, for example, a pressure sensor for sensing static pressure and which may be of the type which provides a feedback voltage at the inputs 32 of the input function module 28 having a magnitude indicative of the pressure being sensed. The input function module 28 receives the feedback voltage from the remote sensor 30 and converts the feedback voltage from the remote sensor 30 to a voltage readable by the voltage input CH10 of the digital control module. To that end, the input function module 28 may scale the feedback voltage and convert the feedback voltage to a differential voltage readable by the input CH10 of the digital control module 16.

In performing the closed-loop operation associated with the static pressure of the enclosed space 20, the digital control module 16 at periodic intervals samples the condition of input channel CH10 and issues digital control signals at output OCH10 for controlling the field device 24. In providing the output control signals, the digital control module 16 generates an error signal having a magnitude which is the difference between the static pressure sensed by the remote sensor 30 and the setpoint dictated by the network control module 14. If the static pressure of the enclosed space 20 is different than the setpoint, the digital control module will issue a digital control signal at output OCH10 to cause the output function module 22 to provide a change in analog voltage to the fan motor controller of the field device 24 for increasing the air flow into the enclosed space 20. When the static pressure within the enclosed space 20 reaches the setpoint, this condition is sensed by the remote sensor 30 and the digital control module will then maintain the control signal to be issued at output OCH10 to cause the output function module 22 to maintain the analog control voltage to maintain the speed of the fan motor of the field device 24. This process continues to maintain the static pressure within the enclosed space 20 at the setpoint value dictated by the network control module 14.

To provide the control signals at output OCH10, the digital control module 16 includes a PID Controller 34. The PID Controller is coupled to the input CH10 through an analog input module 36 and to the output OCH10 through an analog output module 38. The analog input module 36 digitizes the analog feedback input signal from the input function module 28 to provide the PID Controller with a floating point binary representation of the level being sensed by the remote sensor 30. The analog output module 38 converts the floating point digital output provided by the PID Controller at its output 40 to a digital binary representation of the control signal value to be applied to the field device 24 and which is converted from the digital form to the analog form by the output function module 22.

The PID Controller is of a type well known in the art which provides at its output 40, in reaction to the feedback signal, a control signal at predetermined intervals having a level derived from the sum of proportional, integral and derivative factors of the feedback signal. In doing so, the PID Controller generates an error signal which is the difference between the setpoint provided by the network control module and the level of the parameter sensed by the remote sensor 30.

The digital control module 16 further includes an optical coupler 42 which is coupled to the bus 18 and to a communication module 44. The optical coupler 42 provides optical coupling between the digital control module 16 and the bus 18 to provide isolation between the digital control module 16 and the bus 18. The communication module 44 distributes information in command signals from the network control module 14 within the digital control module 16. For example, the communication module 44 is coupled to the PID Controller 34 for providing the PID Controller with, for example, the setpoints associated with the various parameters under the control of the digital control module 16. The communication module 44 is also coupled to the analog output module 38 for purposes to be described hereinafter.

In accordance with the present invention, the field device 24 may be removed from automatic control under the control of the digital control module 16 to manual control under the control of a manually selected control signal. This may be accomplished by the analog output module 38 decoupling the PID Controller 34 from the field device 24 responsive to a software override command from the network control module 14 or by the output function module 22 responsive to an auto/manual switch 23 being thrown from an automatic position to a manual position. The analog output module 38 decouples the PID Controller 34 from the field device 24 responsive to the software override signal which may be originated from the network terminal 50 coupled to the network control module 14, or by the personal computer 15 coupled to the network control module over the bus 12. When the analog output module 38 provides the software override, the level of the control signal provided to the field device 24 may be manually selected at the network terminal 50 or personal computer 15. The control signal magnitude is conveyed to the analog output module 38 through the network control module 14, the bus 18, the optical coupler 42, and the communication module 44. In this case, the field device 24 will respond to affect the parameter being controlled in the enclosed space 20 by the manually selected control signal selected at the network terminal 50 or personal computer 15.

When the field device 24 is removed from automatic control to manual control by the output function module 22, the magnitude of the control signal applied to the field device 24 is manually selected by a dial 25 within the output function module 22. In this condition, the field device 24 then responds to the control signals selected at the dial 25.

When the analog output module 38 decouples the PID Controller 34 from the field device 24 in response to a software override command signal, the analog output module, in accordance with the present invention, causes the PID Controller to cease providing its control signal at output 40. To this end, the analog output module 38 is coupled to the PID Controller 34 through a connection 46. The type of output is also transferred through connection 46. The PID Controller is informed if the output is of a proportional type or an incremental type. The analog output module 38 thus serves as a first interface means to decouple the PID Controller 34 from the field device, to cause the PID Controller 34 to cease providing its control signal at output 40.

It can also be noted from FIG. 1 that the output function module 22 is coupled back to the analog output module 38. When the field device 24 is removed from automatic control to manual control by the output function module 22, the output function module 22 provides the analog output module 38 with a status signal indicating that the field device 24 is now under manual control by the output function module 22. In response to the status signal, the analog output module 38 also causes the PID Controller 34 to store its last commanded control signal level and the value of the feedback in the storage 48. To this end, the analog output module 38 causes this to occur within the PID Controller 34 through the connection 46. The PID Controller is also informed if the output is of a proportional type or an incremental type. Hence the output function module 22 serves as a second interface means for decoupling the PID Controller 34 from the field device 24.

As will be seen hereinafter, when the analog output module 38 recouples the PID Controller 34 to the field device 24 after having decoupled the PID Controller 34 from the field device 24, at the beginning of the first predetermined time period thereafter, the PID Controller will provide a control signal at its output 40 which is based upon the last manually selected control signal level which was selected by the network terminal 50 or personal computer 15 and provided by the analog output module 38. This signal information is provided by the analog output module 38 to the PID Controller 34 through the connection 46. As will also be seen hereinafter, when the output function module 22 recouples the field device 24 to the PID Controller 34 through the analog output module 38 after having decoupled the PID Controller 34 from the field device 24, at the beginning of the first predetermined time period thereafter, the PID Controller 34 is caused to provide a control signal at its output 40 which is based upon the last commanded level by the PID Controller and the stored and current feedback signal which were stored in its storage 48 when the output module is of the proportional type.

If the analog output module 38 had decoupled the PID Controller 34 from the field device 24 responsive to an override command signal and then recouples the PID Controller 34 to the field device 24, during the time from when the PID Controller 34 is recoupled to the field device 24 to the beginning of the first predetermined time period when the PID Controller 34 issues its first automatic control signal, the analog output module 38 will hold the control signal level at the last commanded level provided by the network terminal 50 or personal computer. If the output function module 22 had decoupled the PID Controller 34 from the field device 24 and then recouples the PID Controller 34 to the field device 24, from the time when the output function module 22 recouples the PID Controller 34 to the field device 24 to the beginning of the first predetermined time period when the PID Controller issues its first automatic control signal at its output 40, one of the following two actions may be taken based on the output module type relayed through line 46. If the output function module type is of the incremental type, then no action is taken by the output function module 22. Thus the field device remains in its current position which is where it was placed while in manual control. If the output function module is of the proportional type, then the PID Controller periodically calculates an estimate of the field device position and issues the command to the analog module by line 40 which in turn cause the register 27 of the output function module 22 to be updated. This estimate is calculated based on the last automatic control signal level issued by the PID Controller and the stored and current feedback signal which were stored in its storage 48 as well as the proportionality factor. Thus when the output function module 22 is recoupled to the PID Controller 34 the function module will provide a signal based on the result of this calculation stored in register 27.

Once the PID Controller 34 is recoupled to the field device 24 by either the analog output module 38 or the output function module 22, beginning with the second predetermined time period thereafter, the PID Controller 34 will issue control signals having levels which are equal to the sum of the proportional, integral, and derivative factors or actions. The manner in which the PID Controller 34 may be implemented in accordance with the preferred embodiment for reassuming this automatic control will be more fully described with respect to the flow diagrams of FIGS. 5 and 6.

Figure 2:
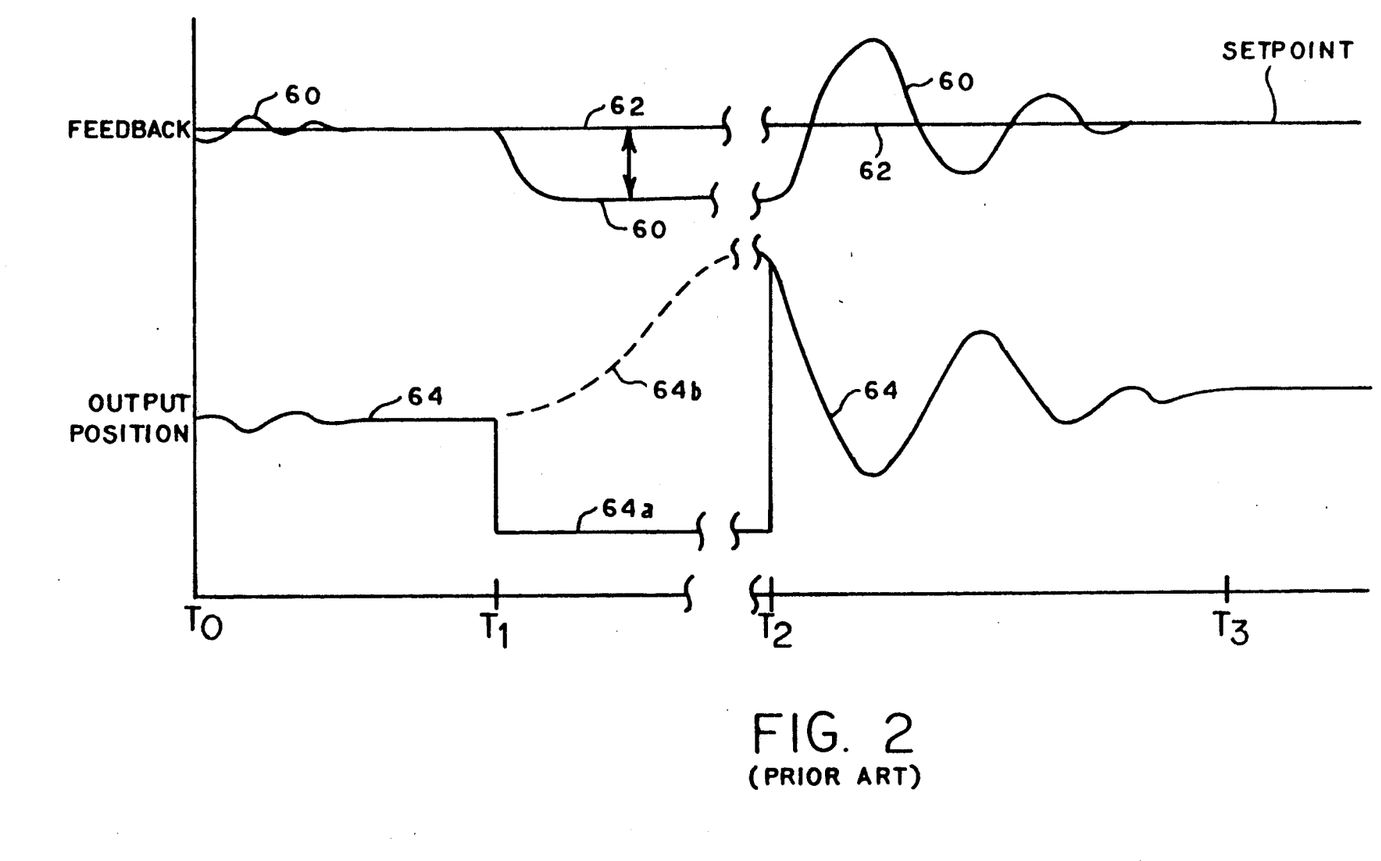
FIG. 2 is a set of representative wave forms illustrating the relative signal levels of a setpoint signal, a feedback signal, a PID Controller output, and a manually selected control signal generated in a prior art facility management system as a field device is removed from automatic control and thereafter returned to automatic control.

Referring now to FIG. 2, it illustrates typical wave forms which result when a prior art facility management system PID Controller is first decoupled from a field device which it is controlling and then is recoupled to the field device. As can be noted from FIG. 2, from time T0 to time T1, the PID Controller 34 is coupled to the field device 24 and the feedback signal 60 deviates from the setpoint 62 by small amounts as a result of the output control signal 64 applied to the field device and changing load conditions in the enclosed space. At time T1, the PID Controller 34 is decoupled from the field device 24 and the field device 24 is placed under the control of a manually selected output control signal 64a. During the time between time T1 and time T2, the field device is under control of the manually selected control signal level 64a. During this time, the feedback signal 60 deviates from the setpoint 62 by a small percentage error and the PID Controller, although decoupled from its field device, continues to generate PID control signals shown by the dashed line 64b responsive to the error signal. As can be noted from the dashed line, the PID Controller output 64b increases, mainly due to the integral action of the controller. At time T2, the PID Controller is once again recoupled to the field device. It will be noted that, because of the integral action the output of the PID Controller is at a considerably high level. The high level of the PID Controller causes the field device to overreact and the feedback signal 60 to consequently deviate widely from the setpoint 62. This causes the PID Controller output to decrease rapidly in an effort to bring the parameter of the enclosed space under control to the setpoint. As a result, and as can be seen in FIG. 2, from time T2 to time T3 there continues to be wide fluctuations in the feedback signal 60 about the setpoint 62 and the control signal 64 applied to the field device until time T3 when the system reaches an equilibrium control condition. As will be seen hereinafter, by virtue of the present invention, the wide fluctuations in the feedback signal and the output control signal are greatly diminished and, as a result, the equilibrium control condition is achieved much sooner after return to automatic operation.

Figure 3:
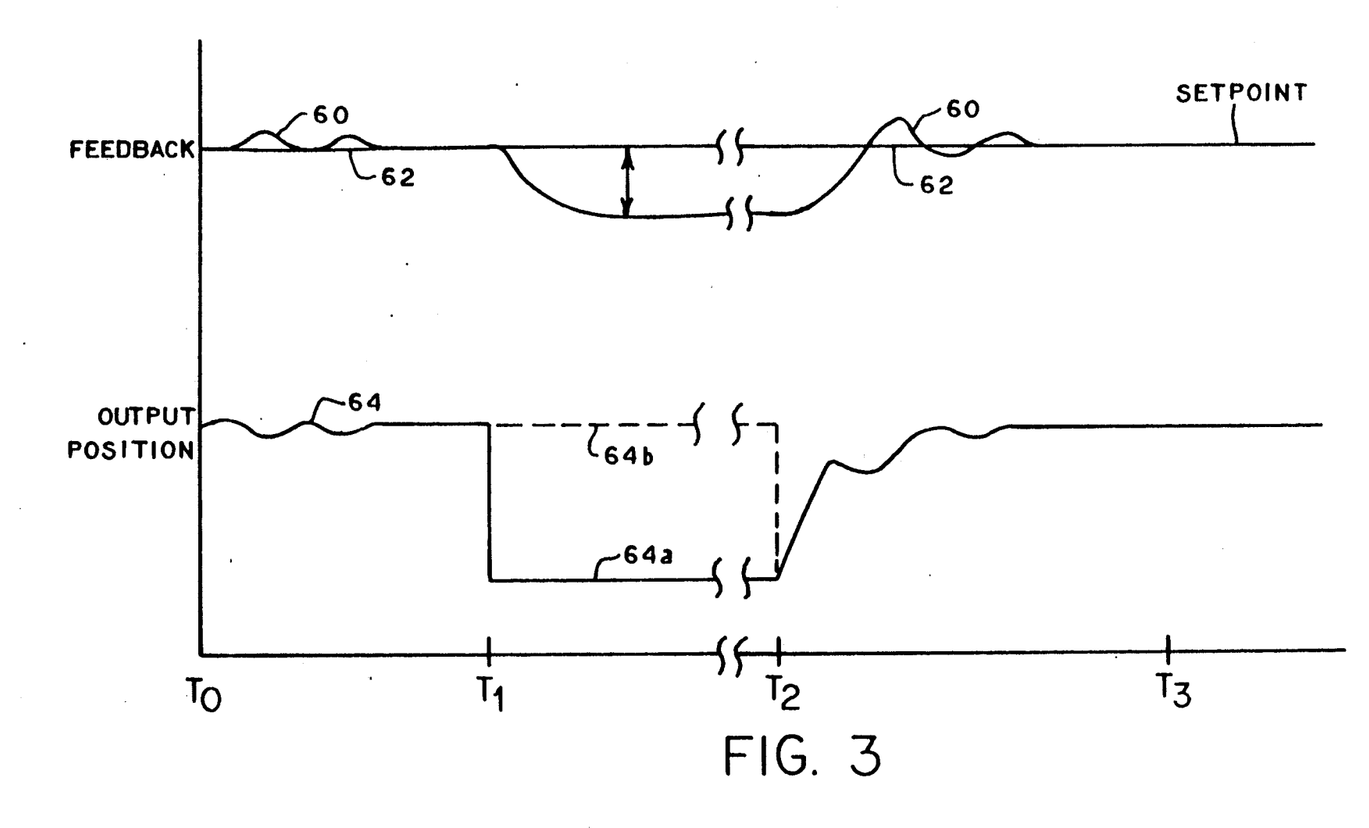
FIG. 3 is a set of representative wave forms illustrating the relative signal levels of a setpoint signal, a feedback signal, a PID Controller output, and a manually selected control signal generated in a facility management system embodying the present invention as a field device is removed from automatic control to manual control and thereafter returned to automatic control in accordance with one aspect of the present invention.
Figure 4:
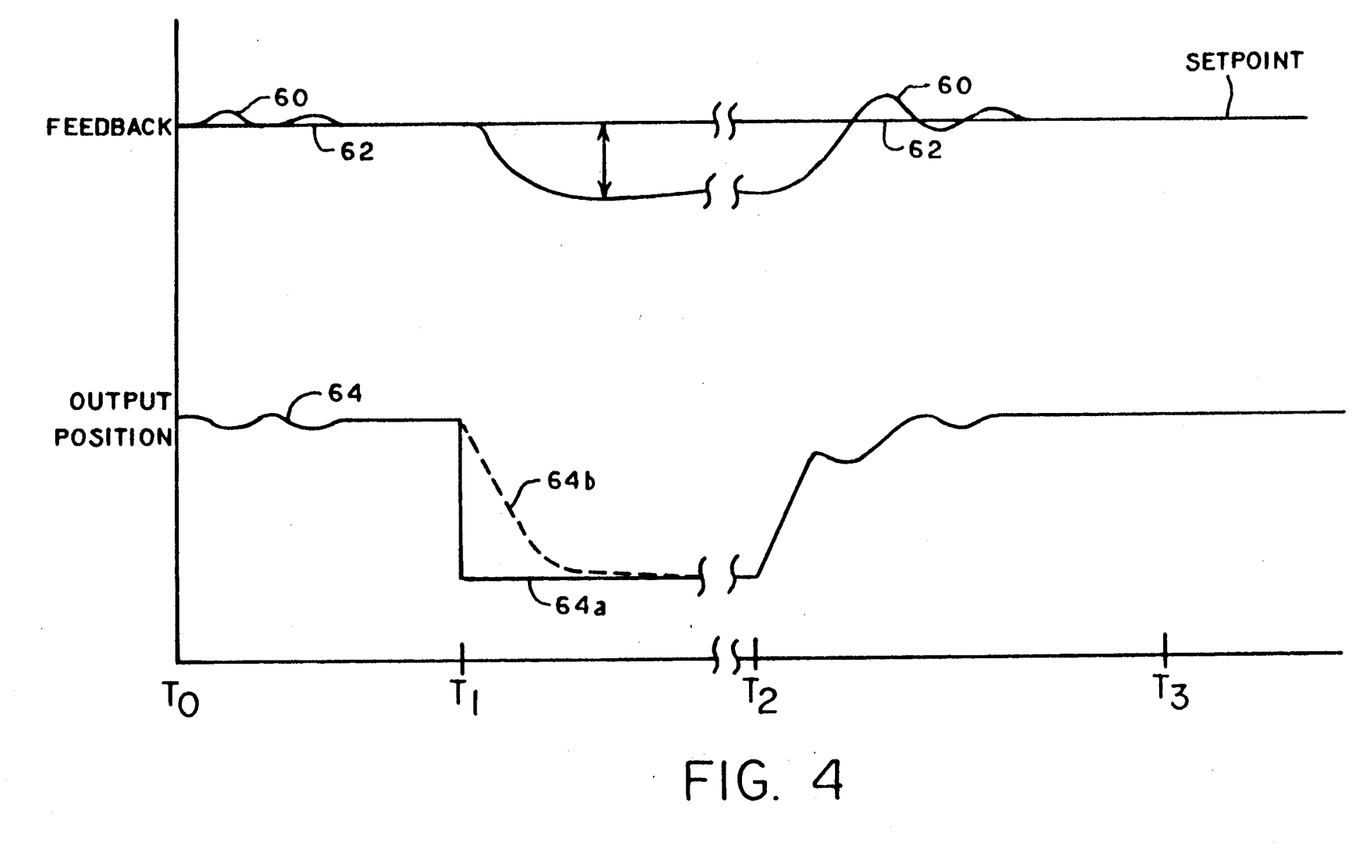
FIG. 4 is a set of representative wave forms illustrating the relative signal levels of a setpoint signal, a feedback signal, a PID Controller output, and a manually selected control signal generated in a facility management system embodying the present invention as a field device is removed from automatic control to manual control and thereafter returned to automatic control in accordance with another aspect of the present invention; and, FIGS. 5 and 6 are flow diagrams which, when taken together, illustrate the manner in which the PID Controller of FIG. 1 may be implemented in practicing the present invention for providing a smooth transition from manual control to automatic control of a field device in accordance with the present invention.

Referring now to FIG. 3 it illustrates the operation of the facility management system in accordance with the present invention when the analog output module 38 first decouples the PID Controller 34 from the field device 24 and then recouples the PID Controller 34 to the field device 24. From time T0 to time T1, the PID Controller 34 is coupled to the field device 24 and the feedback signal 60 deviates from the setpoint 62 by small amounts as a result of the output control signal 64 applied to the field device and changing load conditions in the enclosed space. At time T1, the analog output module 38 under command of a software override signal decouples the PID Controller 34 from the field device 24 and places the field device 24 under a manually selected control signal 64a. The PID Controller 34 stores the last commanded output control signal level 64b shown in dashed lines and does not generate control output signals until the beginning of the first predetermined time period beginning at T2 after being recoupled to the field device 24 by the analog output module 38. It will be noted that just prior to time T2, when the analog output module 38 recouples the PID Controller 34 to the field device 24, the analog output module 38 provides a control signal to the field device which is equal to the last manually selected level of the control signal. At time T2, the PID Controller 34 takes over control of the field device from a control signal level based upon the last manually selected level before being recoupled to the field device. Because the PID Controller was not generating a control signal output, and because the PID Controller reassumes control at a level based upon the last manually selected level, the output of the PID Controller upon being recoupled to the field device is not at the excessively high level as shown in FIG. 2 with respect to prior art arrangements. As a result, from time T2 to time T3, there is less variation between the feedback signal 60 and the setpoint 62 and the equilibrium control condition is reached at T3 much sooner. At the beginning of the second predetermined time interval, the PID Controller 34 thereafter, for each interval, provides a control signal which is equal to the sum of the proportional, integral, and derivative actions Referring now to FIG. 4, it illustrates the operation of the facility management system of the present invention when the output function module of the proportional type first decouples the PID Controller 34 from the field device 24 and then, thereafter, recouples the PID Controller 34 to the field device 24. Again, from time T0 to T1, the output control signal 64 causes very little variation between the feedback signal 60 and the setpoint 62. At time T1, when the output function module decouples the PID Controller 34 from the field device 24 to control the field device at a manually selected control signal level 64a, there is some error between the feedback signal 60 and the setpoint 62. However, the PID Controller 34 terminates the generation of its output control signals at output 40 based on the sum of the integral, derivative and proportional reactions to the feedback signal and instead stores in its storage 48 the last commanded output control signal level generated by the PID Controller 34, as well as the value of the feedback. If the output type relayed to the PID Controller 34 from the analog module is of a proportional type, the PID Controller will continue to issue at output 40 control signals (as illustrated in FIG. 4 by dashed line 64b) based on the following equation:

OUTPUT COMMAND=last commanded PID output+((feedback−stored feedback)*100/PBAND)

where PBAND is the proportional factor's coefficient. Such coefficients and the manner of selecting the same are well known in the art. This in turn will cause the register 27 to be updated with an estimated level of the control signal selected at the dial 25. If the output type relayed to the PID Controller 34 from the analog module is incremental, the PID Controller 34 terminates the generation of its output control signals at output 40. When the output function module first returns control of the field device 24 to the PID Controller, the output function module will provide the field device with a control signal at a level equal to the last value stored in its storage 27. At time T2, the beginning of the first time interval after the output function module returns control of the field device to the PID Controller 34, the PID Controller 34 provides an output at an initial level which is based on the following equation if the output is of the proportional type:

OUTPUT COMMAND=last commanded PID output+((feedback−stored feedback)*100/PBAND)

or based on the last commanded output level if the output is of the incremental type. This causes the error between the feedback signal 60 and setpoint 62 to diminish rapidly, causing less overshoot of the setpoint, and return to the equilibrium control condition at time T3 which is considerably shorter than the corresponding time illustrated in FIG.1.

Figure 5:
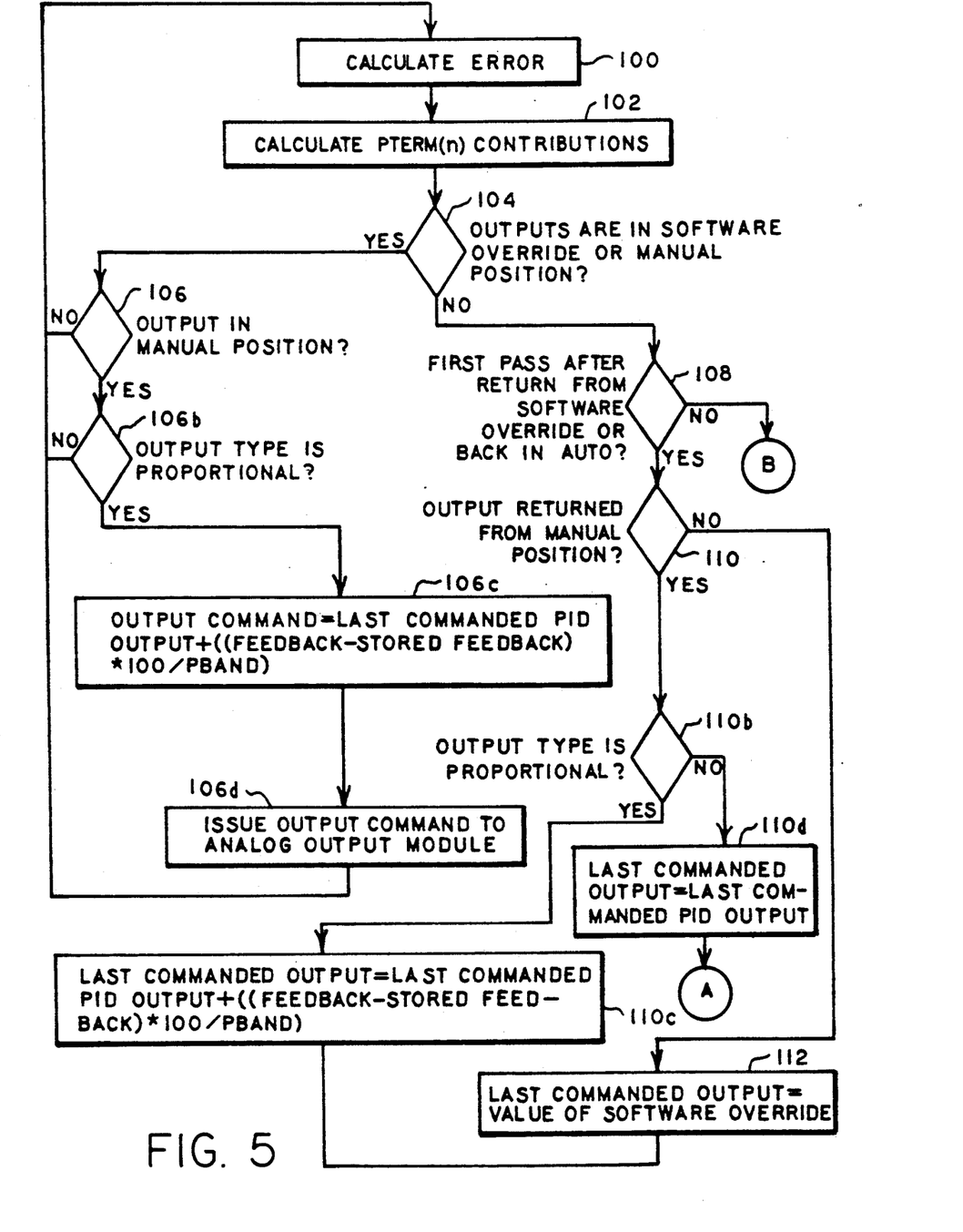
Figure 6:
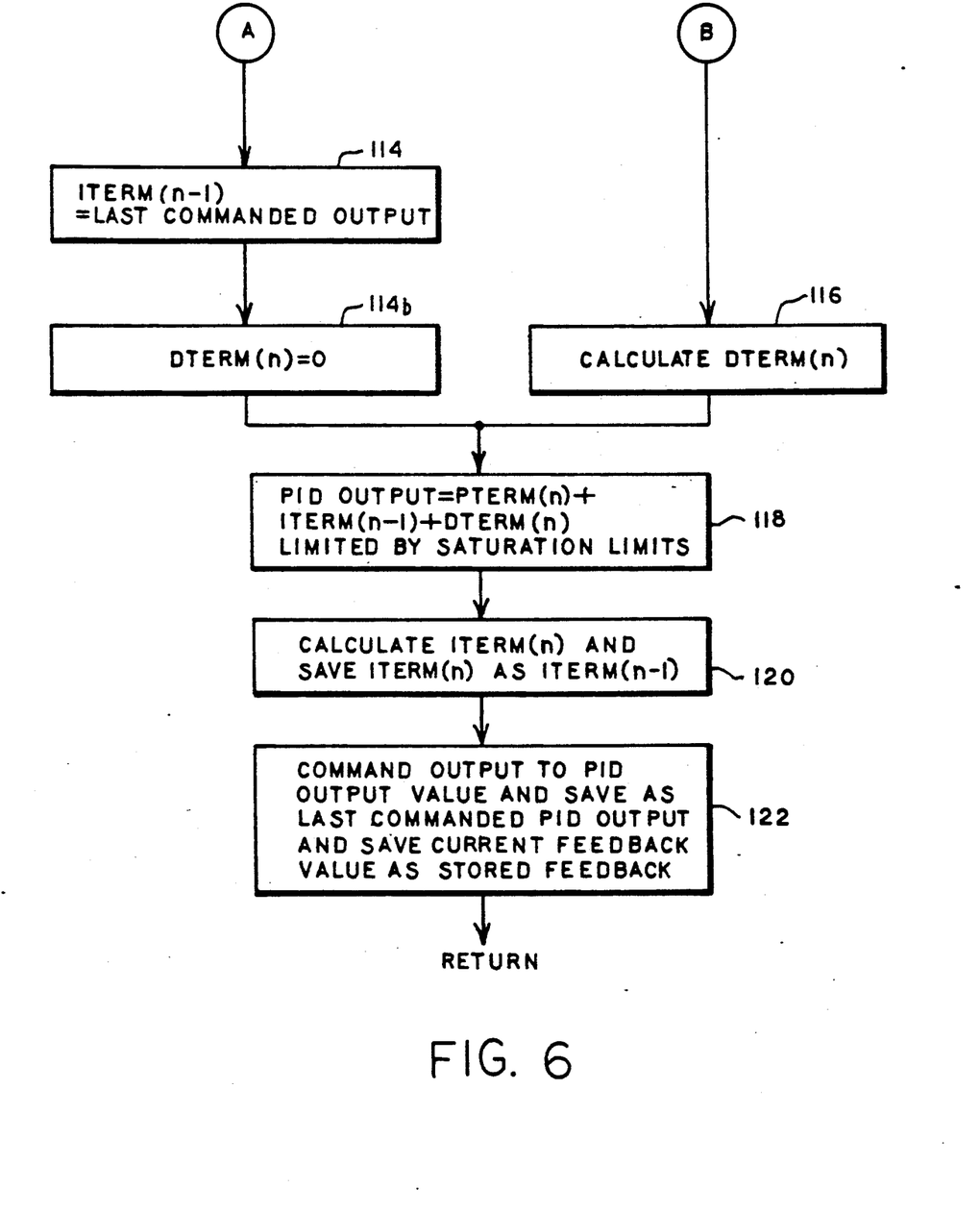

Referring now to the flow diagrams of FIGS. 5 and 6, these flow diagrams illustrate the manner in which the PID Controller may be implemented in accordance with the present invention for returning to automatic control of the field device after having been first decoupled from the field device and then recoupled to the field device. The PID Controller steps through the steps of the flow diagrams of FIGS. 5 and 6 at the beginning of each time interval as previously mentioned.

The PID Controller first calculates in step 100 the error between the feedback signal 60 and the setpoint 62. The PID Controller 34 next, in step 102, calculates the proportional factor or term for the current time interval (n). Next, in step 104, the PID Controller determines if its outputs are in the software override or manual position. If they are, the PID Controller 34 proceeds to step 106 where it determines if the analog output function module 38 or output function module 22 decoupled the PID Controller from the field device 24. If the analog output module decoupled the PID Controller, the PID Controller returns to step 100. If the output function module decoupled the PID Controller, the PID Controller then proceeds to step 106b where the output type is determined. If the output is of the proportional type then output command is calculated in step 106c and the command is issued to analog output module 38 in step 106d thereafter, the PID controller returns to step 100. If the output is of the incremental type, then no further steps are performed and the PID controller returns to step 100.

If its outputs are not in the software override or manual position, the PID Controller 34 next determines in step 108 if this is the beginning of the first interval after being returned to automatic control from a software override or a manual override condition. If it is, the PID Controller proceeds to step 110 to determine if its outputs were returned from the manual condition by the output function module. If the PID Controller is not being returned from the manual condition, or, in other words, if the PID Controller is returned from the software override condition, it will set in step 112 its last commanded position as the last software override or manually selected control signal level.

If PID Controller 34 is being returned from the manual condition, then it will determine in step 110b the output type. If the output is of the proportional type, in step 110c the last commanded output is set equal to the following:

last commanded PID output+((feedback−stored feedback)*100/PBAND).

If the output type is incremental, the last commanded output is set equal to the last commanded level by the PID Controller in step 110d which it stores in its storage 48 after being decoupled from the field device 24.

After step 112, or after determining that its outputs were returned from the manual position, the PID Controller proceeds to step 114. In step 114, the PID Controller sets the integral factor for the preceding time interval as being equal to the last commanded output. The last commanded output is either equal to the value of the software override control level determined in step 112, the last commanded level by the PID Controller (step 110d) which it stored in its storage 48 after being decoupled from the field device 24, or the last commanded output as determined in step 110c. After step 114, the PID Controller proceeds to step 114b where the derivative reaction is zeroed.

In step 116, the PID Controller calculates the derivative term for the current time interval (n). Next, in step 118, the PID Controller calculates its control output level which is equal to the sum of the integral factor for the preceding time interval, the derivative factor for the current time interval, and the proportional factor for the current time interval. The PID Controller then in step 120 calculates the integral factor for the current time interval and stores this factor as the integral factor for the preceding time interval to be used during the next iteration of the PID Controller.

The PID Controller lastly, in step 122, provides the output level determined in step 118 and then stores that level in its storage 48 as the last commanded output in the event that the PID Controller is decoupled from the field device before its next iteration. The PID Controller also stored the current feedback level as the stored feedback level. This output level determined in step 118 is issued by the PID Controller in the form of a floating point digital signal which for a proportional type output is then converted by the analog output module 38 to a binary representation of the desired output control signal level which is then converted to an analog voltage by the digital-to-analog converter in the output function module and applied to the field device. The output level determined in step 118 is issued by the PID Controller in the form of a floating point digital signal which for an incremental type of output is converted into a pulse having a duration (off-on-off) proportional to the magnitude of the change in the command sent to the analog module 38. The sign of the change is indicated by the use of two binary signals supported by one function module. One signal indicates an increasing change, the other a decreasing change.

If in step 108 the PID Controller had determined that this was not the first pass after being returned to automatic control, it would have proceeded directly to step 116 for calculating the derivative term for the current time interval. As a result, as can be seen in FIGS. 5 and 6, at the beginning of the first time interval after being returned to automatic control, the PID Controller bases its output on the last level of the manually selected control signal applied by the analog output module 38, the last commanded level by the PID Controller which it stored in its storage 48 after being decoupled from the field device 24 by an output function module of the incremental output type, or the last commanded PID output+((feedback−stored feedback)*100/PBAND) which is an estimation of the control signal selected at the dial 25.

As can be seen from the foregoing, the present invention provides a new and improved control system which provides for a smooth transition from manual control to automatic control. This is provided by the PID Controller 34 being caused to terminate generation of its control signal based on the sum of the integral, derivative, and proportional actions to the error or feedback signal during the time in which the field device is placed under manual control and by returning the PID Controller to automatic control at a level based upon either the last manually selected control level, in the case of a software override, or upon the estimated level of the control signal selected at the dial 25 in the case of a manual override by the output function module of the proportional type, or upon its last commanded level in the case of a manual override by the output function module of the incremental type. The end result is less deviation from the setpoint upon being returned to automatic control and significantly less time in reaching an equilibrium control condition.

While a particular embodiment of their present invention has been shown and described, modifications may be made, and it is therefore intended to cover all such changes and modifications which fall within the true spirit and scope of the invention.

What is claimed is:

1. A control system wherein said automatic control means is of type which controls a parameter to maintain said parameter at a given set point, said control system comprising:
   device means responsive to an automatic signal when under automatic control or a manually selected control signal when under manual control for effecting said parameter;
   sensor means for sensing the level of said parameter and providing a feedback signal responsive to said sensed parameter level;
   automatic control means coupled to said sensor means and being responsive to being coupled to said device means for generating an automatic control signal for said device means having a level derived from the sum of integral, derivative, and proportional actions to said feedback signal for automatically controlling said device means;
   interface means coupled between said automatic control means and said device means for coupling said automatic control means to said device means to place said device means under automatic control and for decoupling said automatic control means from said device means for placing said device means under manual control of a manually selected control signal; and
   said automatic control means being responsive to being decoupled from said device means by said interface means for terminating the generation of said automatic control signal and arranged for providing said automatic control signal to said device means at an initial level based upon the level of said manually selected control signal upon being recoupled to said device means by said interface means.

2. A control system of the type which controls a parameter to maintain said parameter at a given set point, said control system comprising:
   device means responsive to an automatic control signal when under automatic control or a manually selected control signal when under manual control for effecting said parameter;
   sensor means for sensing the level of said parameter and providing a feedback signal responsive to said sensed parameter level;
   automatic control means coupled to said sensor means and being responsive to being coupled to said device means for generating an automatic control signal for said device means having a level derived from the sum of integral, derivative, and proportional actions to said feedback signal for automatically controlling said device means;
   interface means coupled between said automatic control means and said device means for coupling said automatic control means to said device means to place said device means under automatic control and for decoupling said automatic control means from said device means for placing said device means under manual control of a manually selected control signal; and
   said automatic control means being responsive to being decoupled from said device means by said interface means for terminating the generation of said automatic control signal and arranged for storing the last level of said automatic control signal provided to said device means prior to being decoupled from said device means from said interface means and for storing the last level of said feedback signal received from said sensor means prior to being decoupled from said device means by said interface means wherein said automatic control means is responsive to being recoupled to said device means by said interface means for providing said automatic control signal to said device means at an initial level based upon said stored level of said automatic control signal plus a proportionality factor multiplied by the current feedback signal minus the stored level of said feedback signal.

3. A control system as defined in claim 1 further including manual control means for providing said manually selected control signal and wherein said interface means is further coupled to said manual control means for providing said device means with said manually selected control signal.

4. A control system as defined in claim 3 wherein said interface means is further coupled to said automatic control means for providing said automatic control means with said level of said manually selected control signal.

5. A control system as defined in claim 4 wherein said interface means is arranged to provide said device means with said manually selected control signal until said automatic control means provides said automatic control signal at said initial level.

6. A control system as defined in claim 2 wherein said automatic control means is responsive to being decoupled from said device means by said interface means for providing said control signals to said interface means during periodic intervals at levels based upon the level of said automatic control signal provided to said device means at the time said automatic control means was decoupled from said device means plus a proportionality factor multiplied by the current feedback signal minus the feedback signal at the time said automatic control means was decoupled from said device means, wherein said interface means include means for storing said levels of said automatic control signals provided by said automatic control means, and wherein said interface means is arranged to provide said device means with a control signal at a level equal to said control signal level when said automatic control means is recoupled to said device means and until said automatic control means provides said automatic control signal at said initial level.

7. A control system as defined in claim 6 wherein said interface means include decoupling means manually selectable for decoupling said automatic control means from said device means.

8. A system as defined in claim 7 wherein said interface means further includes manual control means for providing said device means with a manually selected control signal when said interface means has decoupled said automatic control means from said device means.

9. A control system as defined in claim 8 wherein said interface means is arranged to provide said automatic control means with a status signal indicative of the status of said interface means decoupling means.

10. A control system as defined in claim 9 wherein said automatic control means is responsive to said status signal for providing said second interface means with said automatic control signals.

11. A control system as defined in claim 1 wherein said automatic control means is arranged to determine the level of said automatic control signal at periodic time intervals, and wherein said initial level is equal to the sum of the level of said manually selected control signal during the current time interval and said proportional action during the current time interval.

12. A control system as defined in claim 11 wherein said automatic control means is arranged to provide said automatic control signal for each time interval following the provision of said automatic control signal at said initial level at a level equal to the sum of said integral, derivative, and proportional actions.

13. A control system of the type which controls a parameter to maintain said parameter at a given set point, said control system comprising:
   device means responsive to an automatic control signal when under automatic control or a manually selected control signal when under manual control for effecting said parameter;
   sensor means for sensing the level of said parameter and providing a feedback signal responsive to said sensed parameter level;
   automatic control means coupled to said sensor means and being responsive to being coupled to said device means for generating an automatic control signal for said device means having a level derived from the sum of integral, derivative, and proportional actions to said feedback signal for automatically controlling said device means;
   interface means coupled between said automatic control means and said device means for coupling said automatic control means to said device means to place said device means under automatic control and for decoupling said automatic control means from said device means for placing said device means under manual control of a manually selected control signal; and
   said automatic control means being responsive to being decoupled from said device means by said interface means for terminating the generation of said automatic control signal, and arranged for storing the last level of said automatic control signal provided to said device means prior to being decoupled from said device means by said interface means and wherein said automatic control means is responsive to being recoupled to said device means by said interface means for providing said automatic control signal to said device means at an initial level based upon said stored level of said automatic control signal, and arranged to determine the level of said automatic control signal at periodic time intervals, and wherein said initial level is equal to the sum of said stored level and said proportional action during the current time interval.

14. A control system as defined in claim 13 wherein said automatic control means is arranged to provide said automatic control signal for each time interval following the provision of said automatic control signal at said initial level at a level equal to the sum of said integral, derivative, and the proportional actions.

15. A facility management system of the type which controls a parameter to maintain said parameter at a given set point, said control system comprising:
   a field device responsive to an automatic control signal when under automatic control or a manually selected control signal when under manual control for effecting said parameter;
   a remote sensor for sensing the level of said parameter and providing a feedback signal responsive to said sensed parameter level;
   automatic control means coupled to said remote sensor and being responsive to being coupled to said field device for generating an automatic control signal for said field device having a level derived from the sum of integral, derivative, and proportional actions to said feedback signal for automatically controlling said field device;
   interface means coupled between said automatic control means and said device means for coupling said automatic control means to said device means to place said device means under automatic control and for decoupling said automatic control means from said device means for placing said device means under manual control of a manually selected control signal; and
   said automatic control means being responsive to being decoupled from said field device by said interface means for terminating the generation of said automatic control signal and arranged for providing said automatic control signal to said field device at an initial level based upon the level of said manually selected control signal upon being recoupled to said field device by said interface means.

16. A facility management system as defined in claim 15 wherein said automatic control means is arranged to determine the level of said automatic control signal at periodic time intervals, and wherein said initial level is equal to the sum of the level of said manually selected control signal during the current time interval and said proportional action during the current time interval.

17. A facility management system as defined in claim 16 wherein said automatic control means is arranged to provide said automatic control signal for each time interval following the provision of said automatic control signal at said initial level at a level equal to the sum of said integral, derivative, and proportional actions.

18. A facility management system of the type which controls a parameter to maintain said parameter at a given set point, said control system comprising:
- a field device responsive to an automatic control signal when under automatic control or a manually selected control signal when under manual control for effecting said parameter;
- a remote sensor for sensing the level of said parameter and providing a feedback signal responsive to said sensed parameter level;
- automatic control means coupled to said remote sensor and being responsive to being coupled to said field device for generating an automatic control signal for said field device having a level derived from the sum of integral, derivative, and proportional actions to said feedback signal for automatically controlling said field device;
- interface means coupled between said automatic control means and said device means for coupling said automatic control means to said device means to place said device means under automatic control and for decoupling said automatic control means from said device means for placing said device means under manual control of a manually selected control signal; and
- said automatic control means being responsive to being decoupled from said field device by said interface means for terminating the generation of said automatic control signal and arranged for storing the last level of said automatic control signal provided to said device means prior to being decoupled from said device means by said interface means and for storing the last level of said feedback signal received from said sensor means prior to being decoupled from said device means from said interface means wherein said automatic control means is responsive to being recoupled to said device means by said interface means for providing said automatic control signal to said device means at an initial level based upon said stored level of said automatic control signal plus a proportionality factor multiplied by the current feedback signal minus the stored level of said feedback signal.

19. A facility management system as defined in claim 15 further including manual control means for providing said manually selected control signal and wherein said interface means is further coupled to said manual control means for providing said field device with said manually selected control signal.

20. A facility management system as defined in claim 19 wherein said interface means is further coupled to said automatic control means for providing said automatic control means with said level of said manually selected control signal.

21. A facility management system as defined in claim 20 wherein said interface means is arranged to provide said field device with said manually selected control signal until said automatic control means provides said automatic control signal at said initial level.

22. A facility management system as defined in claim 18 wherein said automatic control means is responsive to being decoupled from said field device by said second interface means for providing said automatic control signal to said interface means during periodic intervals at levels based upon the level of said automatic control signal provided to said field device at the time said automatic control means was decoupled from said field device plus a proportional factor multiplied by the current feedback signal minus the feedback signal at the time said automatic control means was decoupled from said field device, wherein said interface means include means for storing said levels of said automatic control signals provided by said automatic control means and wherein said interface means is arranged to provide said field device with a control signal at a level equal to the last said stored automatic control signal level when said automatic control means is recoupled to said field device and until said automatic control means provides said automatic control signal at said initial level.

23. A facility management system as defined in claim 22 wherein said interface means include decoupling means manually selectable for decoupling said automatic control means from said field device.

24. A facility management system as defined in claim 23 wherein said interface means further includes manual control means for providing said field device with a manually selected control signal when said interface means has decoupled said automatic control means from said field device.

25. A facility management system as defined in claim 24 wherein said interface means is arranged to provide said automatic control means with a status signal indicative of the status of said interface means decoupling means.

26. A facility management system as defined in claim 25 wherein said automatic control means is responsive to said status signal for providing said interface means with said automatic control signals.

27. A facility management system of the type which controls a parameter to maintain said parameter at a given set point, said control system comprising:
- a field device responsive to an automatic control signal when under automatic control or a manually selected control signal when under manual control for effecting said parameter;
- a remote sensor for sensing the level of said parameter and providing a feedback signal responsive to said sensed parameter level;
- automatic control means coupled to said remote sensor and being responsive to being coupled to said field device for generating an automatic control signal for said field device having a level derived from the sum of integral, derivative, and proportional actions to said feedback signal for automatically controlling said field device; and
- interface means coupled between said automatic control means and said device means for coupling said automatic control means to said device means to place said device means under automatic control and for decoupling said automatic control means from said device means for placing said device means under manual control of a manually selected control signal;

said automatic control means being responsive to being decoupled from said field device by said interface means for terminating the generation of said automatic control signal, arranged for storing the last level of said automatic control signal provided to said field device prior to being decoupled from said field device by said interface means and wherein said automatic control means is responsive to being recoupled to said field device by said interface means for providing said automatic control signal to said device means at an initial level based upon said stored level of said automatic control signal, and arranged to determine the level of said automatic control signal at periodic time intervals, and wherein said initial level is equal to the sum of said stored level and said proportional action during the current time interval.

28. A facility management system as defined in claim 27 wherein said automatic control means is arranged to provide said automatic control signal for each time interval following the provision of said automatic control signal at said initial level at a level equal to the sum of said integral, derivative, and proportional actions.

29. A facility management system of the type which controls an environment parameter to maintain said parameter at a given set point, said facility management system comprising:

a field device responsive to an automatic control signal when under automatic control or a manually selected control signal when under manual control for effecting said environmental parameter;

a remote sensor for sensing the level of said environmental parameter and providing a feedback signal responsive to the sensed parameter level;

automatic control means coupled to said remote sensor and responsive to being coupled to said field device for generating an automatic control signal for said field device having a level derived from the sum of integral, derivative, and proportional actions to said feedback signal to place said field device under automatic control;

first interface means for coupling said automatic control means to and decoupling said automatic control means from said field device, said first interface means being arranged to provide said field device with said manually selected control signals upon decoupling said automatic control means from said field device;

said automatic control means being responsive to being decoupled from said field device by said first interface means when said field device is under manual control for terminatng the generation of said automatic control signal and being responsive to being recoupled to said field device by said first interface means for providing said automatic control signal to said field device at a first initial level based upon the level of said manually selected control signal upon being recoupled to said field device; and second interface means coupled between said first interface means and said field device for coupling said first interface means to said field device, said second interface means being arranged for converting said automatic control signals to analog automatic control signals and including decoupling means for decoupling said first interface means and said automatic control means from said field device, and wherein said automatic control means is responsive to being decoupled from said field device by said second interface means for providing said automatic control signals to said second interface means during periodic intervals at levels based upon the level of said automatic control signal provide to said field device at the time said automatic control means was decoupled from said field device plus a proportionality factor multiplied by the current feedback signal minus the feedback signal at the time said automatic control means was decoupled from said field device.

30. A facility management system as defined in claim 29 wherein said second interface means is arranged for storing the levels of said automatic control signals after decoupling said field device from said automatic control means and wherein said second interface means is responsive to recoupling said field device to said automatic control means for providing said field device with a control signal at a level equal to the last stored level of said automatic control signals.

31. A facility management system as defined in claim 30 wherein said automatic control means is arranged to provide said field device with a control signal at an initial level based upon said last stored level during the first time interval after being recoupled to said field device by said second interface means.

32. A facility management system as defined in claim 31 wherein said automatic control means is arranged to provide said automatic control signal for each time interval following the provision of said automatic control signal at said initial level at a level equal to the sum o said integral, derivative, and proportional actions.

* * * * *